United States Patent
Wiesler

[15] 3,648,169
[45] Mar. 7, 1972

[54] PROBE AND HEAD ASSEMBLY

[72] Inventor: Mordechai Wiesler, Lexington, Mass.

[73] Assignee: Teledyne, Inc., Hawthorne, Calif.

[22] Filed: May 26, 1969

[21] Appl. No.: 827,518

[52] U.S. Cl..................324/158 F, 324/158 P, 324/72.5
[51] Int. Cl...................................................G01r 31/22
[58] Field of Search..................324/158, 158 P, 72.5, 149, 324/125; 274/38

[56] References Cited

UNITED STATES PATENTS

| | | | |
|---|---|---|---|
| 2,594,948 | 4/1952 | Lynch | 274/38 XR |
| 2,670,962 | 3/1954 | Holtz, Jr. | 274/38 |
| 1,022,515 | 4/1912 | Tendler | 274/38 |
| 3,333,274 | 7/1967 | Forcier | 324/158 P |
| 3,439,273 | 4/1969 | Sills | 324/125 |
| 3,453,545 | 7/1969 | Oates | 324/158 |

Primary Examiner—Rudolph V. Rolinec
Assistant Examiner—Ernest F. Karlsen
Attorney—Morse, Altman & Oates

[57] ABSTRACT

A probe and head assembly is provided for use particularly in testing electronically microelectronic devices such as integrated circuit wafers and the like. A very thin probe tip of one piece construction is formed with an integral parallel beam construction and plugs into the head assembly which is adjustable in different coordinate directions.

4 Claims, 5 Drawing Figures

Patented March 7, 1972

INVENTOR.
MORDECHAI WIESLER
BY
Morse, Altman & Oates
ATTORNEYS

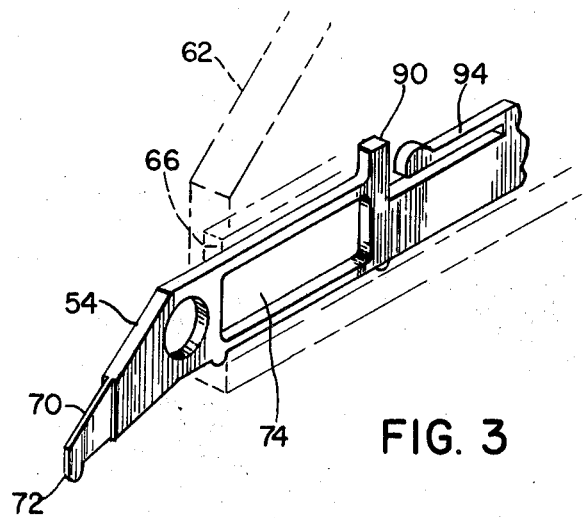
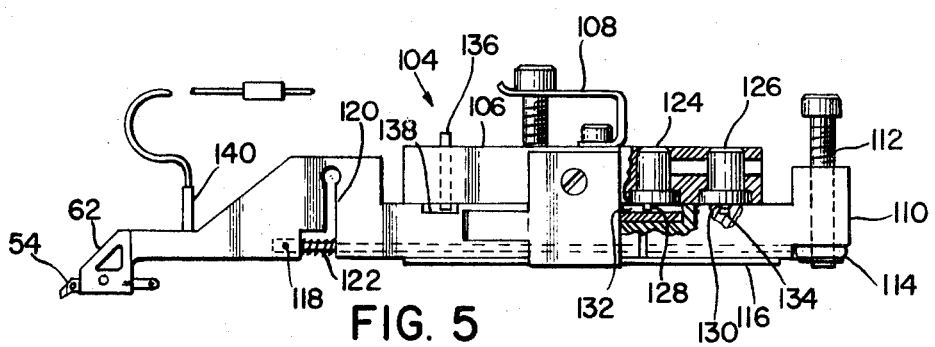
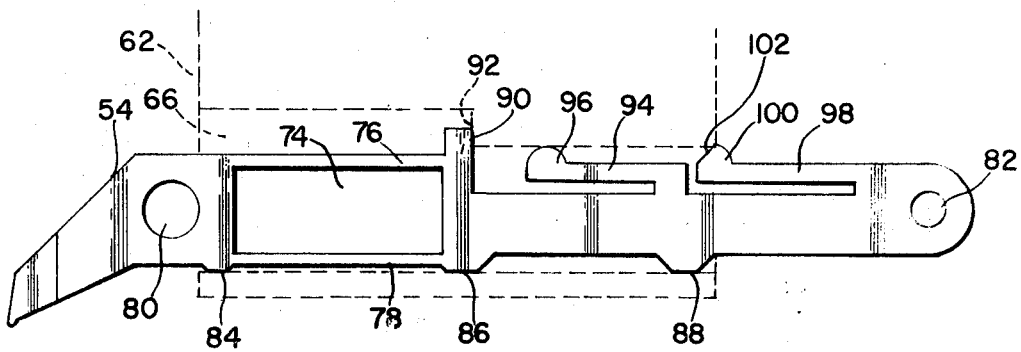

PROBE AND HEAD ASSEMBLY

BACKGROUND OF THE INVENTION

1. Field of the Invention

This invention relates to test equipment for electronic devices and more particularly is directed towards a probe tip and head assembly for use in conjunction with the testing of miniature electronic devices such as a wafer of integrated circuits or the like.

2. History of the Prior Art

In automatic equipment for testing microelectronic devices probing heads are mounted about the work such as a wafer of integrated circuits. An automatic positioning table of the sort disclosed in U.S. application Ser. No. 449,754, filed Apr. 21, 1965 now abandoned or in U.S. Pat. No. 3,446,065, moves the wafer incrementally along X and Y axes in the horizontal plane. At each index position a probe tip or tips contacts the circuit, as by moving the probe or the wafer along the Z axis until contact is made. At each index position the probe tip or tips contacts the circuit to perform one or more test functions. These techniques are employed to record the test results of each particular circuit device.

In practice, the integrated circuit wafer is quite small and there is usually a very limited area for probes to operate. Also the wafer is fragile and contact between the probe and the wafer should be made with a minimum of frictional movement and low mass to prevent damage by abrasion or the like. Devices of this sort heretofore available generally involve a spring-mounted head assembly with a mounting device for replaceable probe tips. The units generally have been rather large and mechanically complicated and, in addition, the replacement of the probe tips from time to time involves rather careful manipulation and adjustment.

Accordingly, it is an object of the present invention to provide improvements in probe tips and head assemblies for use in electronic test equipment of the foregoing type and more particularly to provide a simplified probe tip head assembly characterized by plug in replacement mounting arrangement for the tip to the head assembly. Another object of this invention is to provide a probe tip capable of high-density probing, presenting minimum frictional contact with the test piece, and low-moving mass.

SUMMARY OF THE INVENTION

This invention features a probe tip and head assembly comprising a thin, planar unitary probe tip having integral parallel beam construction and adapted to be plugged into a cooperating socket in a head assembly. The head assembly includes means for making XYZ adjustments within a defined range.

BRIEF DESCRIPTION OF THE DRAWINGS

FIG. 3 is a fragmentary view in perspective showing details of the probe tip and its cooperating mount, FIG. 4 is a view in side elevation of the probe tip, and, FIG. 5 is a view in side elevation, partly in section, showing a modification of the invention.

DETAILED DESCRIPTION OF THE PREFERRED EMBODIMENTS

Figure 1:
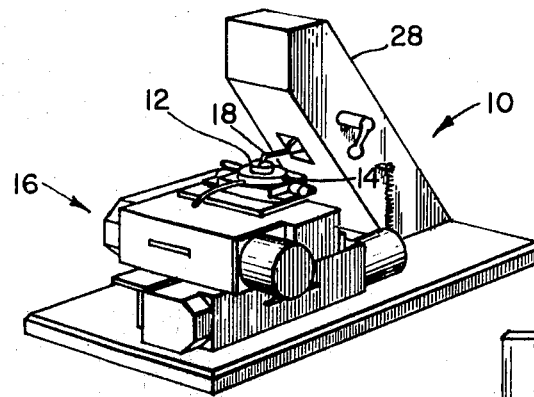
FIG. 1 is a view in perspective of an automatic test apparatus utilizing a probe tip and head assembly made according to the invention.

Referring now to the drawings and to FIG. 1 in particular, there is illustrated apparatus 10 for testing electronic devices such as a wafer 12 of integrated circuits. Typically a wafer 12 of integrated circuits will be comprised of a grid array of identical microminiature circuits etched in the wafer by well known techniques. Each integrated circuit is repeated through the wafer and, while it is intended that each circuit operate in identical manner, in practice, there will be some variations in the quality of the individual circuit elements. It is, therefore, necessary to test and grade individual circuit elements according to their operating characteristics.

In practice, the wafer 12 is mounted on a chuck 14 adapted to reciprocate the wafer along a vertical or Z axis on signal. The chuck 14 is carried on an XY table 16 adapted to index the chuck and wafer in the horizontal plane through X and Y axes. The wafer is indexed and at each indexed position moves against a probe 18 which performs an electrical test. Typically a number of probes will be organized above the wafer so as to perform multiple test functions simultaneously on each circuit. Only one probe is shown in FIG. 1 for purposes of illustration, however, it will be understood that in practice a ring of probes may be crowded together above the wafer.

Figure 2:
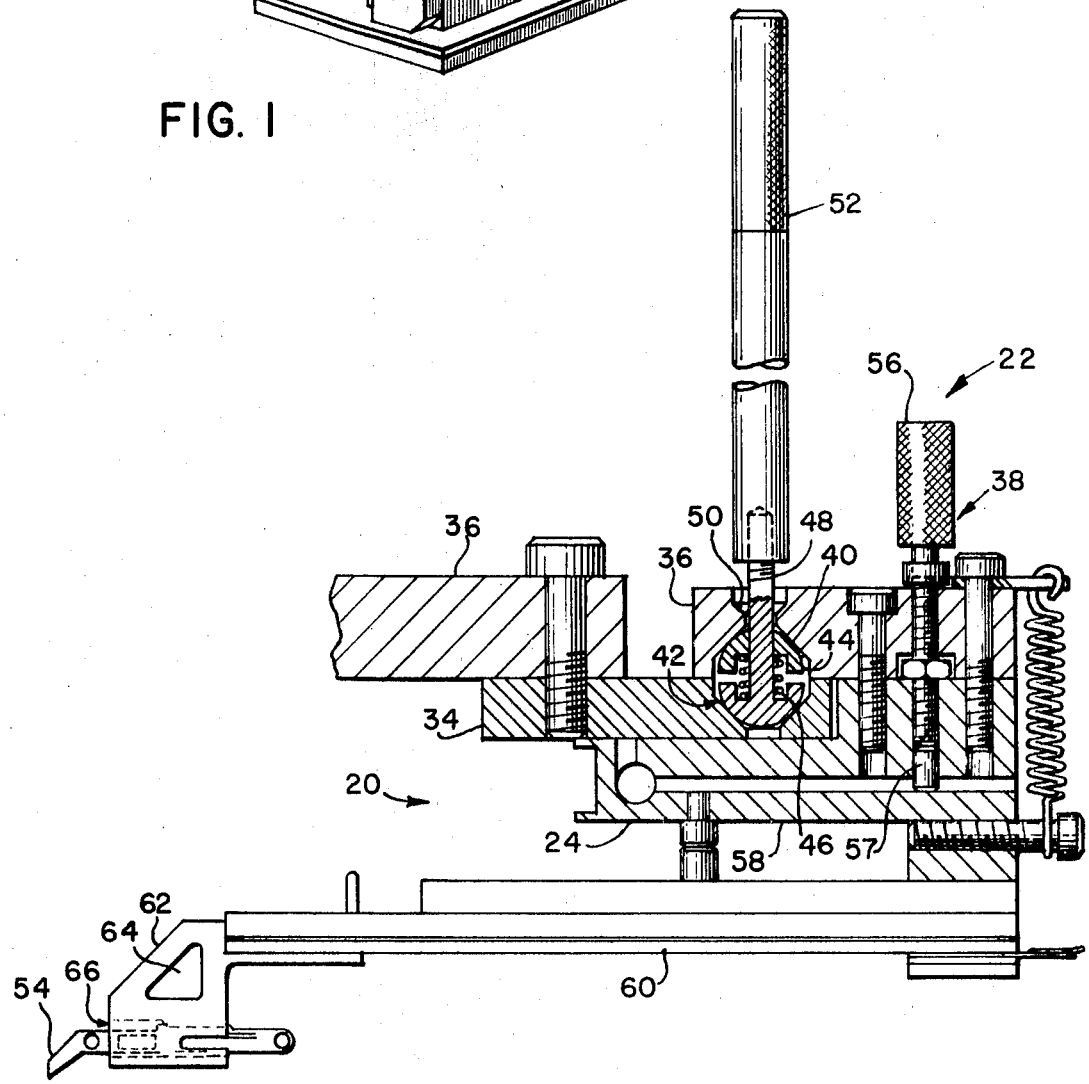
FIG. 2 is a view in side elevation, partly in section, showing a probe tip and head assembly made according to the invention.

Referring now to FIG. 2 of the drawings there is shown a probe head assembly including an adjustment mechanism 22 of the sort shown in U.S. Pat. No. 3,399,963. This probe head assembly includes a bifurcated block 24 suspended from a bracket or ring 26 mounted to a standard 28 above the chuck 14 and wafer 12. The head assembly comprises a relatively fixed lower plate 34 and a slidable upper plate 36 connected as by screws and it will be seen that the extended left-hand portion of the block projects underneath the lower plate to slidably engage with it. This arrangement holds the upper plate to the lower plate.

The two plates are coupled to one another by means of a joy stick adjusting mechanism indicated at 38. This mechanism includes a split ball 40, the lower half-ball being seated in a recess 42 formed at the top surface of the lower plate while the upper half-ball is seated in recess 44 formed in the lower surface of the upper plate. The two half-ball spheres are so confined as to allow a gap between them to achieve an overall oval shape rather than a true ball. A coil spring 46 is compressed between the ball halves urging the two halves apart. A pin 48 passes through a countersunk opening 50 formed in the upper plate opposite the recess 44. The lower end of the pin passes through the center of the upper ball-half through the coil spring and is fixed to the lower ball-half. A handle 52 is attached to the upper end of the pin and by manipulating the joy stick through different angular movements the upper plate may be laterally displaced to permit fine adjustment of a probe tip 54 with respect to the workpiece through the horizontal plane.

To permit the probe tip to be raised or lowered with respect to the workpiece an adjusting screw 56 is provided. This screw is spring loaded and is threaded to the upper plate 36. The lower end of the adjusting screw passes through the block to bear against a slug 56. The slug bears against the lower leg 58 of the bifurcated block whereby the lower leg may be biased to or away from the main portion of the block according to the position of the screw 56. Thus the probe tip can be lowered or raised by control of the screw 56.

Carried by the lower leg 58 of the bifurcated block is an arm 60 the left-hand or free end of which carries a socket head 62 for a replacable probe tip 54 plugged therein.

The socket head 62 is a unitary structure of relatively thin cross section and formed with an opening 64 to reduce weight and increase the strength of the head. The head is also formed with a slot passage 66 extending through the lower portion thereof parallel to the arm 60. The passage 66 is formed with an internal shoulder 68 for cooperative engagement with a portion of the probe tip 54 to be described more fully below. The slot passage 66 is dimensioned to snugly receive the probe tip 54 when inserted therein from the left-hand side thereof. The construction is such that probe tips may be readily removed and replaced by a simple plug-in operation.

Referring now more particularly to FIGS. 3 and 4, the probe element 54 will be described in detail. The probe element 54 in the illustrated embodiment is a flat, elongated, unitary structure, typically less than 1 inch in overall length and having a thickness of perhaps 0.006 inch, for example through its body portion. An integral nose portion 70 typically is on the order of 0.002 inch in thickness and a length of perhaps 0.040 inch, for example. The nose portion 70 has a tip portion 72 of slightly rounded profile and serves as the contact against the workpiece. The nose portion will be seen to extend forwardly and downwardly of the body portion.

The body portion is characterized by a rectangular opening 74 defining parallel beams 76 and 78 integral with the body portion. This integral parallel beam construction permits deflection of the tip in response to contact with the workpiece, which deflection is substantially perpendicular to the plane of the workpiece this usually being a vertical deflection and with minimum scrub on the workpiece. The body portion is confined in the holder 62 which minimizes lateral motion. Additional circular openings 80 and 82 are provided to reduce the weight of the element.

Along the lower edge of the element 54, there is formed a plurality of pads 84, 86 and 88 spaced from one another and adapted to bear against the bottom wall of the slot passage 66 in the holder 62. The upper edge of the element 54 is formed with an integral shoulder 90 which is adapted to butt against a cooperating internal shoulder 92 formed in the slot passage 66. The shoulders 90 and 92 provide a positioning stop arrangement for the element 54 when it is plugged into the passage. Rearwardly of the shoulder 90 there is formed an integral insertion latch 94 extending parallel to the main body portion of the element 54 and having a rounded boss 96 which bears against the upper wall of the passage 66. The latch 94 serves to hold the element 54 tightly in position within the slot and provide spring-loading thereof. The forward position of the element 54 rests in the holder on the front pad 84 to create a preloaded force characteristic for the element. It will be noted that clearance is provided in the slot passage 66 above the left-hand or forward portion of the element 54 to allow for the forward end of the element to deflect in response to contact with the workpiece. The element 54 is locked in position within the holder by means of a locking latch 98 located rearwardly of the insertion latch 94 and of similar construction excepting its boss 100 is formed with a beveled face 102 to engage the back face of the holder 62 at the rear opening of the passage 66. It will be understood that when the element 54 is inserted from the left-hand end of the slot the latches 94 and 98 will depress as they move through the passage 66 and when the shoulder 90 butts against the shoulder 92 the element will be stopped and the locking latch 98 will snap into locking engagement with the holder. The element is readily removed by manually pressing the latch 98 and pulling the element forwardly or to the left as viewed in FIG. 4.

In the preferred embodiment of the invention, the element 54 is a gold-plated beryllium-copper laminate. This combination of materials has been found to be particularly satisfactory by reason of its desirable spring and electrical characteristics. Obviously, other materials may be used to advantage. The unitary body provides an inherent straight line deflection characteristic by reason of the integral parallel beam construction thereby eliminating more cumbersome deflection mechanism in the holder. The element also provides an electrically conductive path and it will be understood that the element will be electrically connected by suitable means to associated test equipment, not part of this invention. Various modifications may be made to the element 54 such as changing the dimensions of the rectangular opening 74 so as to modify the deflection force characteristics of the element. Also, the element may be fabricated from plastic with conductive material covering at least the contact portion and providing a suitable electrical path for connection with test equipment. Further, the action of the element 54 may be enhanced, particularly when operated at high speed, by the addition of a damping medium applied to the element. Vibration absorbing material such as grease, styrofoam, or the like may be employed with the element and may be in the form of a core disposed in the opening 74. The element provides low contact resistance on the order of 60 mOhms typical for gold-plated elements and under 200 mOhms for oxidized aluminum elements. The elements display a very long operating life, require no force adjustment, provide a low-moving mass and make possible high-density probing with up to 60 points arranged on 5-mil centers.

Referring now to FIG. 5 of the drawings there is illustrated another head assembly for probing operations and the like. The head assembly 104 includes a block 106 mountable to a ring or other supporting bracket above the workpiece by means of a clamp 108. Adjustably connected to the block 106 is a slide member 110, the left-hand end of which carries a holder 62' similar in construction to the holder 62 of FIG. 2. The element 54 is mounted in the holder as previously described.

The slide member 110 is connected to the block 106 for adjustment in the X and Y axes and also is provided with means for adjustment in the Z direction. The Z adjustment is controlled by means of a screw 112 threaded to a tapped hub at the right-hand end of the slide member and formed with a tapered lower end extending through the center of a retaining ring 114. The ring 114 engages the right-hand end of the shipping rod 116 which extends lengthwise of the slide member, the left-hand end being connected by means of a pin 118 to the left-hand portion of the slide member. The left-hand portion of the slide member is bifurcated at 120 to permit limited pivoting of the left-hand tip. A spring 122 is compressed between the walls of the reentrant opening provided by the bifurcation and urging the portions apart. By adjusting the screw 112 up or down the tapered end will move into or out of the retaining ring, causing the shipping rod 116 to be pulled to the right under a downward thrust of the screw or upon retraction of the screw to be moved to the left under the force of the spring 122, thereby moving the tip of the probe up or down as required.

X and Y adjustment of the tip is provided by means of rotatable cams 124 and 126 mounted in the block 106. Each cam is provided with a slotted upper end for rotation as by a screw driver and its lower end carries an eccentric pin 128 and 130. The pin 128 extends into a lengthwise slot 132 formed in the upper face of the slide member while the pin 130 extends into a transverse slot 134 also formed in the upper face of the slide. A pivot pin 136 is fixed to the left-hand end of the block and extends down into a lengthwise slot 138 formed in the slide member. By simply rotating either or both of the cams 124 and 126 the slide member may be made to pivot about the pin 136 or to move lengthwise thereof. Thus adjustment in both the X and the Y directions may be made by simple selective operation of the cams. An electrical connection 140 is provided at the left-hand end of the holder for joining the tip with the test circuitry.

Having thus described the invention what I claim and desire to obtain by Letters Patent of the United States is:

1. A probe assembly for making contact with integrated circuit wafer under test, comprising:
   a. a unitary body portion,
   b. a slide portion movably mounted on said unitary body portion, said slide portion being formed with a cutaway section operating to divide said slide portion into two portions, one portion being a resilient hinged portion and the other portion being a relatively fixed portion, said slide portion also formed with a pair of lengthwise slots and a transverse slot; and
   c. means operatively engaging said lengthwise and transverse slots for selective adjustment of said slide portion with respect to said unitary body portion; and
   d. a probe mounted on said resilient portion said probe being formed with one opening defining a pair of parallel beam segments extending between a tip portion and the remaining part of said probe, said tip portion extending in a plane substantially perpendicular to said parallel beam segments which operate to deflect said tip portion in a plane perpendicular to the plane of said workpiece when said tip portion and workpiece are engaged whereby said tip portion will deflect with respect to the remaining part of said probe when said remaining part is restrained and said tip portion engages aid integrated circuit under test.

2. A holder for probes comprising:
   a. a relatively fixed body portion;
   b. a slide portion movably mounted to said body portion;
   c. means for mounting probes to said slide portion;
   d. said slide portion being formed with a cutaway section operating to divide said slide portion into two portions, one portion being a resilient hinged portion and the other portion being a relatively fixed portion, said slide portion formed also with a pair of lengthwise slots and a transverse slot;
   e. a pin extending from said body portion into one of said elongated slots;
   f. a pair of rotatable cams mounted to said body portion and extending into the other of said slots for selective adjustment of said slide portion with respect to said body portion;
   g. said probe mounting means carried by said hinged portion;
   h. an elongated member extending from said fixed portion and engaging said hinged portion; and
   i. a tapered screw threaded to said fixed portion and extending through a cooperating circular opening formed in said member for selectively moving said member and thereby said hinged portion.

3. A holder according to claim 2 including spring means compressed between said resilient hinged portion and relatively fixed portion, said spring means operating to urge said two portions apart.

4. A holder for integrated circuit wafer test probes comprising:
   a. a relatively fixed body portion;
   b. a slide portion movably mounted to said body portion;
   c. means for mounting probes to said slide portion;
   d. said slide portion formed with a cutaway section operating to divide said slide portion into two portions, one portion being a resilient hinged portion and the other portion being a relatively fixed portion, said probe mounting means carried by said hinged portion;
   e. said slide portion formed also with a pair of lengthwise slots and a transverse slot;
   f. a pin extending from said body portion into one of said elongated slots; and
   g. a pair of rotatable cams mounted to said body portion and extending into the other of said slots for selective adjustment of said slide portion with respect to said body portion.

* * * * *